United States Patent [19]

Paik

[11] Patent Number: 4,841,772

[45] Date of Patent: Jun. 27, 1989

[54] THREE-AXIS SUPERCONDUCTING GRAVITY GRADIOMETER

[75] Inventor: Ho J. Paik, Silver Spring, Md.

[73] Assignee: University of Maryland, College Park, College Park, Md.

[21] Appl. No.: 127,971

[22] Filed: Dec. 3, 1987

[51] Int. Cl.[4] .................. G01V 7/00; G01V 7/06; G01V 7/08

[52] U.S. Cl. .................. 73/382 G; 73/382 R; 73/517 R

[58] Field of Search .............. 73/382 R, 382 G, 517 R

[56] References Cited

U.S. PATENT DOCUMENTS

| 3,424,006 | 1/1969 | Dicke et al. | 73/382 R |
| 3,449,956 | 6/1969 | Goodkind et al. | 73/382 R |
| 3,554,034 | 8/1968 | La Force | 73/382 R |

FOREIGN PATENT DOCUMENTS 2887440 2/1980 U.S.S.R. ................. 73/382 G

OTHER PUBLICATIONS

*Superconducting Techniques for Gravity Survey and Inertial Navigation,* Chan, H. A.; Paik, H. J.; Moody, M. V.; Parke, J. W., IEEE Trans Magn, vol. MAG-21, No. 2, Mar. 1985, pp. 411-414.

*Gravitational Antenna with Souid as Sensor,* A. V. Gusev and V. N. Rudenko, Soviet Physics JETP, vol. 45, No. 4, Apr. 1977, pp. 637-644.

*Superconducting Gravity Gradiometers,* H. J. Paik and E. R. Mapoles, American Inst. Physics Conf. Proc., No. 44, pp. 166-170 (1978).

*Superconducting Tunable Diaphragm Transducer for Sensitive Acceleration Measurements,* Paik, H. J., Journal of Applied Physics, vol. 47, No. 3, Mar. 1976, pp. 1168-1178.

*A Prototype Superconducting Gravity Gradiometer,* van Kann, F. J. et al., IEEE Trans. Mang., vol. MAG-21, No. 2, Mar. 1985, pp. 610-613.

H. A. Chan, M. V. Moody, H. J. Paik and J. W. Parke, Department of Physics and Astronomy, University of Maryland, College Park, Md., 20742, U.S.A., "Development of Three-Axis Superconducting Gravity Gradiometer", Proc. 17th Int. Conf. Low Temp. Physics, Kahlsruhe, W.G., pp. 927-928, 1984.

J. W. Parke et al., Department of Physics, University of Maryland, College Park, Md., 20742, U.S.A., "Sensitivity Enhancement of Inertial Instruments by Means of a Superconducting Negative Spring", 1984.

(List continued on next page.)

*Primary Examiner*—Stewart J. Levy
*Assistant Examiner*—Robert P. Bell
*Attorney, Agent, or Firm*—Oblon, Fisher, Spivak, McClelland & Maier

[57] ABSTRACT

Each accelerometer includes a cylindrical proof mass made of a superconducting material. Each proof mass includes annular upper and lower hollowed out portions longitudinally surrounded by a cylindrical exterior wall. Common mode and differential mode sensing coils are arranged adjacent a bottom-side surface of the proof mass in one hollowed out annular portion and a levitation coil is arranged adjacent a bottom-side surface of the proof mass in the other hollowed out annular portion. The common mode, differential mode and levitation coils are connected in respective first, second and third superconducting circuits. The first circuit produces common mode signals indicative of forces acting on both accelerometers in the same direction. The second circuit produces differential mode signals indicative of forces acting on the accelerometers in different directions. The third circuit produces a force on each proof mass by which the proof masses are levitated. In addition, a superconducting negative spring coil is wound on the periphery of the coil form. A persistent current is stored in each negative spring loop to cancel the rigidity of the mechanical spring. Also provided are superconducting circuits for common mode and differential mode force rebalance, residual sensitive axis angular misalignment compensation, and differential proof mass levitation at start-up. Either piezoelectric crystal transducers or persistent current loops are used to obtain residual sensitive axis linear misalignment compensation.

29 Claims, 10 Drawing Sheets

OTHER PUBLICATIONS

M. V. Moody et al., Department of Physics and Astronomy, University of Maryland, College Park, Md., 20742, "Superconducting Gravity Gradiometer for Space and Terrestrial Applications", J. Appl. Phys. 60(12), pp. 4308–4315, Dec. 15, 1986.

Ho Jung Paik, Department of Physics and Astronomy, University of Maryland, College Park, Md., 20742, "Geodesy and Gravity Experiment in Earth Orbit Using a Superconducting Gravity Gradiometer", IEEE Transactions on Geoscience and Remote Sensing, vol. GE-23, No. 4, pp. 524–526, Jul. 1985.

M. V. Moody et al., Department of Physics and Astronomy, University of Maryland, College Park, Md., 20742, "Preliminary Tests of a Newley Developed Superconducting Gravity Gradiometer", 1982 Applied Superconductivity Conference, Knoxville, Tenn., pp. 1–4, Nov. 1982.

Ho Jung Paik, Assistant Professor, Department of Physics and Astronomy, University of Maryland, College Park, Md., 20742, "Superconducting Tensor Gravity Gradiometer for Satellite Geodesy and Inertial Navigation", The Journal of the Astronautical Sciences, vol. XXIX, No. 1, pp. 1–18, 1–3/1981.

H. A. Chan et al., Department of Physics and Astronomy, University of Maryland, College Park, Md., 20742, "Superconducting Gravity Gradiometer for Sensitive Gravity Measurements, II, Experiment", Physical Review D Particles and Fields, vol. 35, Third Series, No. 12, pp. 3572–3597, Jun. 15, 1987.

THREE-AXIS SUPERCONDUCTING GRAVITY GRADIOMETER

This invention was made with government support under Contract No. NAS 8-36165 awarded by the National Aeroanutics and Space Administration. The government has certain rights in this invention.

BACKGROUND OF THE INVENTION

1. Field of the Invention

This invention relates to a three-axis superconducting gravity gradiometer and more particularly to improvements in the gradiometer described in the inventor's prior publications in Proc. 17th Int. Conf. Low Temp. Phys., Kahlsruhe, W. Germany (July, 1984), in Proc. 10th Int. Cryogenic Eng. Conf., Helsinki, Finland (August, 1984) and in IEEE Trans. Magnetics, MAG-21, 411 (March, 1985), the descriptions of which are incorporated by reference into the present disclosure, as are the descriptions of all other prior publications noted hereinafter.

2. Discussion of Background

A three-axis in-line gravity gradiometer measures the three diagonal components of the gravity gradient tensor at the same point in space-time. It can be formed from three orthogonal in-line gravity gradiometers [see Paik, J. Astronaut, Sci. 29, pp. 1–17 (1981)]. A "current-differencing" mode is applied. The following is a brief review of an in-line component gradiometer (i.e., a gradiometer which is sensitive to the diagonal components of the gravity gradient tensor, $r_{ii}$), which can be extended to a cross-component gradiometer (i.e., one which is sensitive to an off-diagonal component of the gravity gradient tensor, $r_{ji,j\neq i}$).

An in-line component superconducting gravity gradiometer consists of a pair of spring-mass accelerometers coupled together by a superconducting circuit to measure differential acceleration. As shown schematically in FIG. 1, each accelerometer consists of a superconducting proof mass 10 confined to move along a single axis and a spiral superconducting sensing coil 12 located near the surface of the proof mass 10. An acceleration will cause a displacement of the proof mass 10 which, because of the Meissner effect, will modulate the inductance of the coil 12 at frequencies down to dc. The sensing coil is connected to the input coil 14 of a superconducting quantum interference device (SQUID) amplifier 16 forming a closed superconducting loop. This loop contains a persistent current which couples the mechanical and electrical systems. Since the flux in this loop must remain constant, the change in the inductance of the sensing coil results in a current change through the SQUID input coil 14. In this manner, very small accelerations can be detected.

The following considerations are important for each pair of coupled acceleration transducers:

(1) In order to minimize the contamination of the signal by the SQUID amplifier noise, a very low proof mass resonance frequency in the differential mode is desirable in order to produce, for a given acceleration amplitude, a larger proof mass displacement before it is detected by the superconducting circuit.

(2) The spring used in the suspension should have low loss in order to have lower thermal (Nyquist) noise from the spring.

(3) A precise alignment of the sensitive axes and a high degree of common mode rejection are needed in order to reject the relatively large common accelerations of the gradiometer platform.

The gradiometer discussed in the Proc. 17th Int. Conf. Low Temp. Phys, supra, consists of three pairs of coupled spring-mass type acceleration transducers mounted on six faces of a precision cube. Each pair of acceleration transducers on opposite faces of the cube are coupled passively through a superconducting circuit to measure common and differential accelerations. A gravity gradient signal is measured as the differential acceleration over the baseline between the pair of transducers. A schematic for one transducer is shown in FIG. 2. The center Niobium (Nb) proof mass 10, which is confined to move along a collinear axis by a pair of low-loss cantilever springs 18, displaces in response to an acceleration. Such a displacement modulates the inductance of Nb pancake coils 12 which have stored magnetic flux. Coupling a pair of these transducers in a superconducting circuit and adjusting the stored flux in each loop of this circuit enable an exact, passive and hence noiseless differencing of the accelerations in the form of a supercurrent signal which is measured with a SQUID amplifier.

The superconducting circuit for each single-axis component gravity gradiometer of the inventor's earlier gradiometer is shown in a simplified form in FIG. 3. The coupled motions of the proof masses $m_1$ and $m_2$ can be decomposed into a common acceleration mode and a differential acceleration mode with respectively large and small electromechanical spring constants. These spring constants are due to the soft mechanical springs and the coupled circuit of sensing coils (solid line) and "push-pull levitation" coils (dotted line). The main symmetry breaking element in the spring constants of the two acceleration modes are the push-pull levitation coils 22 which lift $m_1$ and $m_2$ against Earth's gravity and give a strong spring component to the common mode. In the differential mode, however, the inductances of the levitation coils for the two proof masses change in a complementary manner resulting in no change in the total inductance of these coils, which are connected in series as shown. Therefore, these coils form a zero-frequency spring. The terrestrial environment has vibration noise that is several orders of magnitude larger than the gravity gradient signals of interest. A high resonance frequency is desirable for the common mode in order that the gradiometer is less susceptible to disturbances from terrestrial vibrations. The passive common-mode resonance frequency is over 50 Hz.

In order to compromise between alignment precision and sensitivity, a mechanical cantilever-spring suspension was used, to confine the motion of the proof mass along a straight line. The mechanical suspension provides the convenience of employing mechanical precision to align the sensitive axes of a pair of in-line acceleration transducers along a common collinear direction and to align this common axis along a reference axis of the precision cube. The cantilever springs, which are relatively soft in the bending mode but stiff against stretching, provide the confinement for the motion of the proof mass to a one-dimensional motion. However, the mechanical suspension also raises the resonance frequency of the proof mass and hence sets an unnecessary limit on the sensitivity of the gradiometer. A passive superconducting negative spring, which lowers the resonance frequency without adding amplifier noise, can be used, as discussed hereinafter, to extend the intrinsic sensitivity of the gradiometer. Basic design considerations of a passive superconducting negative spring are described by Parke et al, in the above-noted reference, Proc. 10th Int. Cryogenic Eng. Conf., Helsinki, Finland (1984).

Other prior publications of interest are Paik, "Superconducting Tensor Gravity Gradiometer For Satellite Geodesy and Inertial Navigation", Journal of the Astronautical Sciences, Vol. XXIX, No. 1, pp 1–18, January-March, 1981; Moody et al, "Preliminary Tests of A Newly Developed Superconducting Gravity Gradiometer", Proceedings of 1982 Applied Superconductivity Conference, Knoxville, Tenn. (Nov. 1982); and Paik, "Geodesy and Gravity Experiment in Earth Orbit Using a Superconducting Gravity Gradiometer", IEEE Trans. On Geoscience and Remote Sensing, Vol. GE-23, No. 4, July 1985.

SUMMARY OF THE INVENTION

Accordingly, one object of this invention is to provide a new and improved three-axis superconducting gravity gradiometer, in which the resonance frequency of the proof mass for differential mode signals is decreased and that for common mode signals is increased, whereby improved sensitivity and noise immunity is attained.

A further object of the present invention is to provide a new and improved gradiometer, as above noted, which includes inherent compensation for temperature effects in the event that temporary temperature increases affect the superconductivity of the various proof mass surfaces.

Yet another object is to provide the gradiometer of the invention with passive noiseless circuits for correcting for residual sensitive axis angular misalignment between the sensitive axes of the accelerometers of component gradiometers of the three-axis gradiometer of the invention.

Still another object of the present invention is the gradiometer with mechanical axis alignment structures to correct for residual sensitive axis linear misalignment between the sensitive axes of the accelerometers of component gradiometers of the three-axis gradiometer of the invention.

Still a further object of this invention is to provide each accelerometer of each component gradiometer with a new and improved superconducting negative spring which is mechanically simple to construct and which is capable of counterbalancing the mechanical spring-loaded accelerometer mounting.

Still a further object is to provide a new and improved proof-mass for use in a superconducting three-axis gradiometer, which proof-mass enables a mechanically simple implementation of the superconducting negative spring and the attaining a lower resonance frequency for differential mode signals and higher resonance frequency for common mode signals.

These and other objects are achieved according to the invention by providing a new and improved three-axis gradiometer including three-component gradiometers arranged in mutually orthogonal directions, wherein each component gradiometer includes a pair of accelerometers each defining a sensitive axis. Each accelerometer includes a generally cylindrical proof mass made of a superconducting material. Each proof mass includes annular upper and lower hollowed out portions longitudinally surrounded by a generally cylindrical exterior wall. Common mode and differential mode sensing coils are arranged adjacent a bottom-side surface of a portion of the proof mass in one hollowed out annular portion and a levitation coil is arranged adjacent a bottom-side surface of the proof mass in the other hollowed out annular portion. The common mode, differential mode and levitation coils are connected in respective first, second and third superconducting circuits. The first circuit produces common mode signals indicative of forces acting on both accelerometers in the same direction. The second circuit produces differential mode signals indicative of forces acting o the accelerometers in different directions. The third circuit produces a force on each proof mass by which the proof masses are levitated.

By locating the differential and common mode sensing coils on the same side of the proof mass as the levitation coil, i.e., the coils are located adjacent bottom-side surfaces of the proof mass, the invention is possible to overcome the effects of a temperature rise which would otherwise adversely affect the superconducting circuits. In particular, as temperature increases, the penetration depth of the magnetic field produced by the several coils into the adjoining superconducting surface of the proof mass increases, thereby having the effect of increasing the separation of the coils from the superconducting surface of the proof mass. This effect causes the levitation force exerted by the levitation coils to decrease, which causes vertical sagging of the proof mass under the force of Earth's gravity. According to the invention, however, this vertical sagging results in the sensing coils being closer to the superconducting surface of the proof mass, and thereby compensates for temperature induced increase in the magnetic field penetration depth.

The sensing and levitation coils are mounted on respective superconducting support plates separated therefrom by non-superconducting material. In the case of the levitation coil, the levitation coil is located at a sufficiently far distance from the superconducting surface of its support plate so that negligible stray inductance between the levitation coil and the support plate is produced. This results in a sufficient lowering of the differential mode resonance frequency to enable push-pull levitation of the proof masses of the respective component gradiometer.

According to the present invention, a superconducting negative spring is formed in part by the outer cylindrical wall of the proof mass by providing plural disk-like projections on the radially inner surface of cylindrical wall. Mounted adjacent the projections on the periphery of the non-superconducting material of the coil forms of the sensing and levitation coils are negative spring superconducting coils. In this way, the present invention solves the mechanical problem of how to mount the superconducting coils of the negative spring adjacent the projections, while still taking advantage of the above described mounting of levitation coils at a sufficient distance from the respective support plates.

An important feature of the present invention is the use of passive superconducting feedback loops to compensate for residual sensitive axis angular misalignment between accelerometers of each component gradiometer. This is accomplished by placing additional sensing coils and misalignment adjustment coils on each proof mass and transformer coupling respective of the additional sensing coils from two component gradiometers to the adjustment coils of the other gradiometer in a passive superconducting circuit. Six such circuits are provided to compensate for residual sensitive axis angular misalignment of respective component gradiometers.

Residual sensitive axis linear misalignment between the accelerometers of each component gradiometer is also removed according to the invention by physically displacing the accelerometers with respect to each other. This is accomplished by placing between each accelerometer and the mounting cube a mechanical axis aligner with two parallel plates which can be displaced with respect to each other to correct for linear misalignment of the sensitive axes by means of piezoelectric crystal transducer or superconducting current loop. Six such axis aligners are provided to correct for residual sensitive axis linear misalignment of respective component gradiometers.

Differential mode force rebalance for each component gradiometer is accomplished by transformer coupling a signal derived from the differential mode superconducting circuit, along with signals from the residual sensitive-axis angular misalignment sensing coils, back into the adjustment coils of the respective component gradiometers. Common mode force rebalance for each component gradiometer is accomplished according to the invention by transformer coupling a signal derived from the common mode superconducting circuit into the push-pull levitation superconducting circuit including series connected levitation coils of the accelerometers of the component gradiometer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
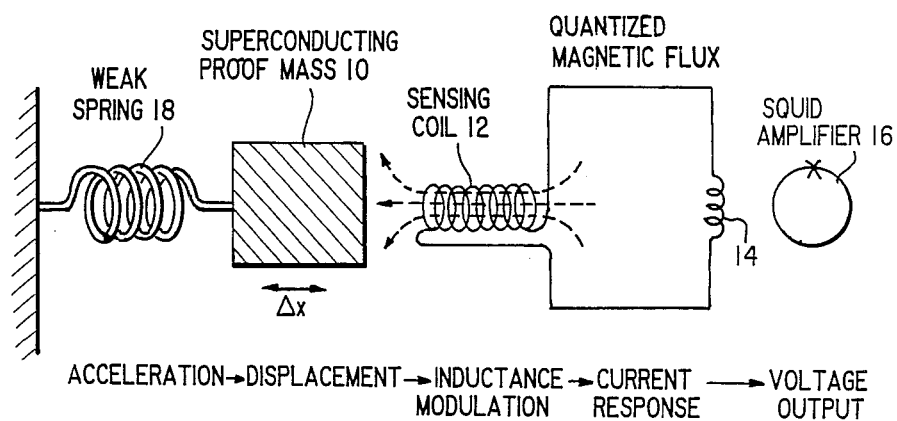
FIG. 1 is a schematic diagram of a superconducting accelerometer.
Figure 2:
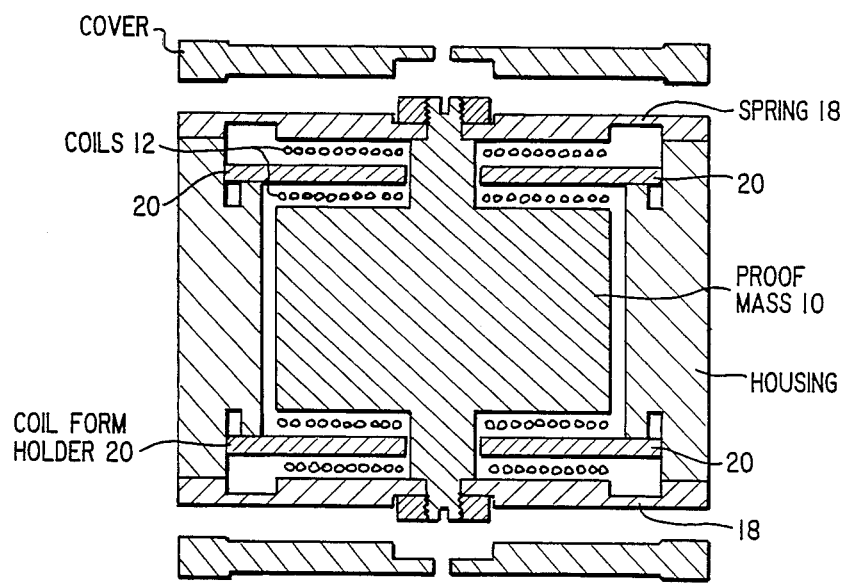
FIG. 2 a schematic cross-sectional view illustrating mechanical design of the acceleration transducer for an earlier three-axis superconducting gravity gradiometer.
Figure 3:
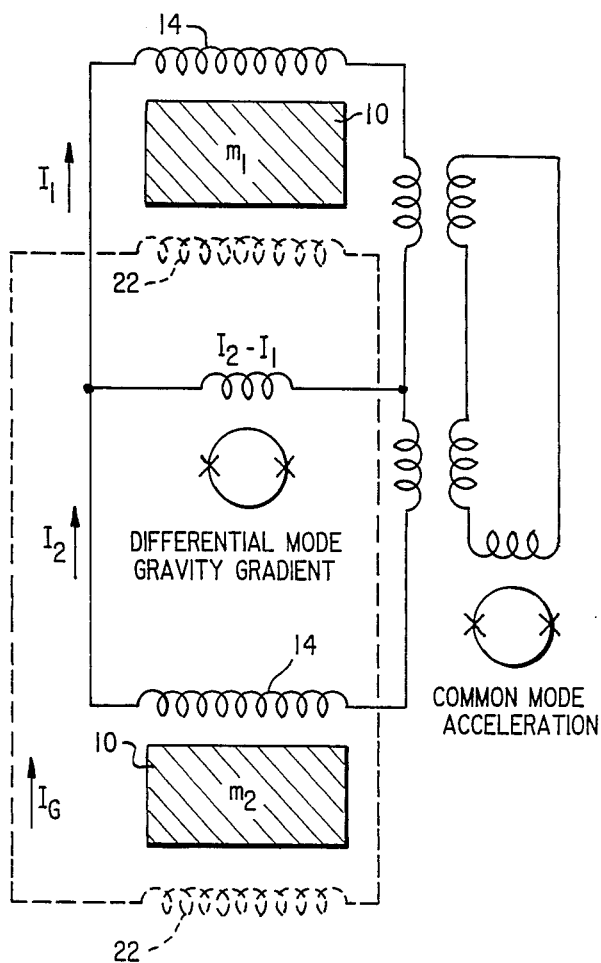
FIG. 3 is a schematic circuit diagram of superconducting sensing (solid line) and levitation (dotted line) circuits for the earlier three-axis gravity gradiometer.
Figure 4:
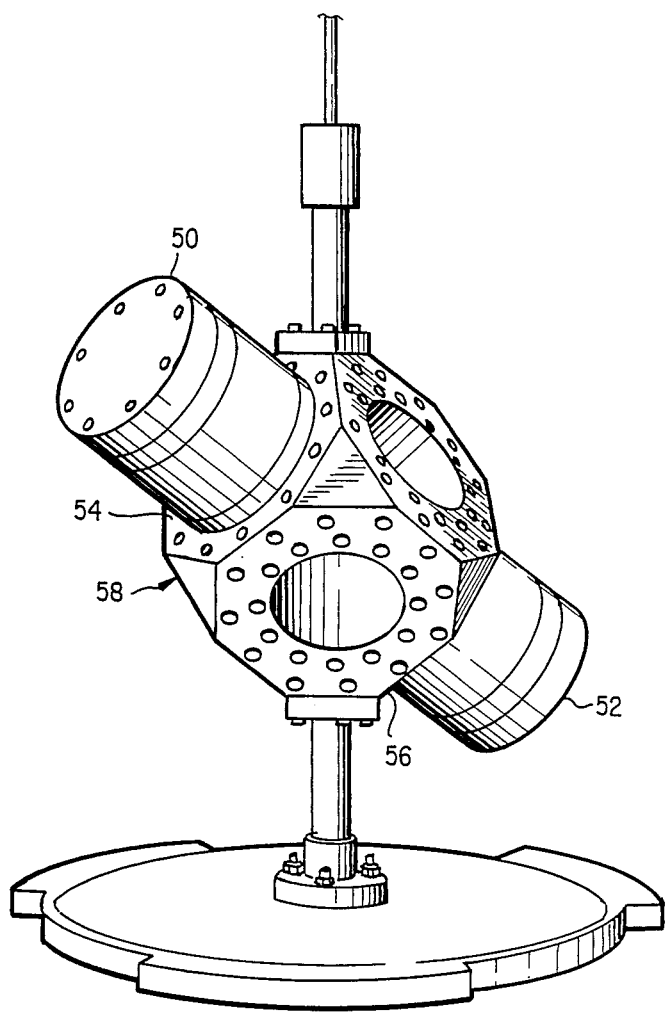
FIG. 4 a perspective view of a component single-axis gradiometer mounted on a precision Ti (TiV$_4$Al$_6$ alloy) cube.

Referring now to the drawings, wherein like reference numerals designate identical or corresponding parts throughout the several views, and more particularly to FIG. 4 thereof, there is conceptually shown in perspective view a component single-axis gradiometer of the three-axis gradiometer of the present invention in umbrella orientation.

Two accelerometers 50, 52 are mounted on the opposite faces 54, 56 of a precision Ti (Ti V$_4$Al$_6$ alloy) cube 58 to form a single-axis component gradiometer. The surfaces of the cube 58 have parallelism and orthogonality within 50 ppm. The same degree of parallelism is kept for the mating surfaces of all the gradiometer parts. The Ti material at the center cube 58 is continued down to an aluminum-to-titanium joint (not shown). An aluminum (Al) base (not shown) is tight fitted onto the Ti at room temperature. Differential contraction tightens the joint further as the assembly is cooled down. A similar joint is made at the upper end. The base line of the component gradiometer, which is defined by the distance between the centers of mass for the two proof masses, is 0.20 m.

As shown in FIG. 4, one triagonal axis of the mounting cube is aligned with the vertical, so that the sensitive axis of the gradiometer is tilted by an angle $$\theta_u = \arctan \sqrt{2}$$

from the vertical. This "umbrella orientation" has the advantage of allowing measurements in three orthogonal directions to be made with each single-axis gradiometer by rotating the gradiometer around the vertical axis by 120° increments. The fact that the large dc gravity bias is matched along the sensitive axes is an important reason to prefer this orientation when a three-axis measurement is called for. Not shown in FIG. 4 are the accelerometers of the other component gradiometers of the invention. As is readily understood, the other accelerometers of the three-axis gradiometer are mounted on the remaining opposed faces of the cube 58.

Not shown in FIG. 4 is a six-axis shaker which is inserted between the three-axis gradiometer and the cryostat. A six-axis shaker under development contains six piezoelectric transducer stacks oriented in proper directions so as to apply calibrated linear and angular accelerations to the gradiometer platform in all six degrees of freedom of rigid-body motion. Component accelerometers are calibrated by using the applied linear accelerations. Common mode balance and residual sensitive axis misalignment balances, as discussed hereinafter, are obtained by nulling the sensitivity of component gradiometers to the applied linear and angular accelerations. The shaker is also used as the six-axis transducer to stabilize the gradiometer platform in the six degrees of freedom. The linear acceleration outputs derived from the common mode sensing circuits of the gradiometer and externally supplied angular acceleration outputs are fed back to the six-axis shaker to obtain a six-axis stabilization of the platform. This art is under development.

Figure 5:
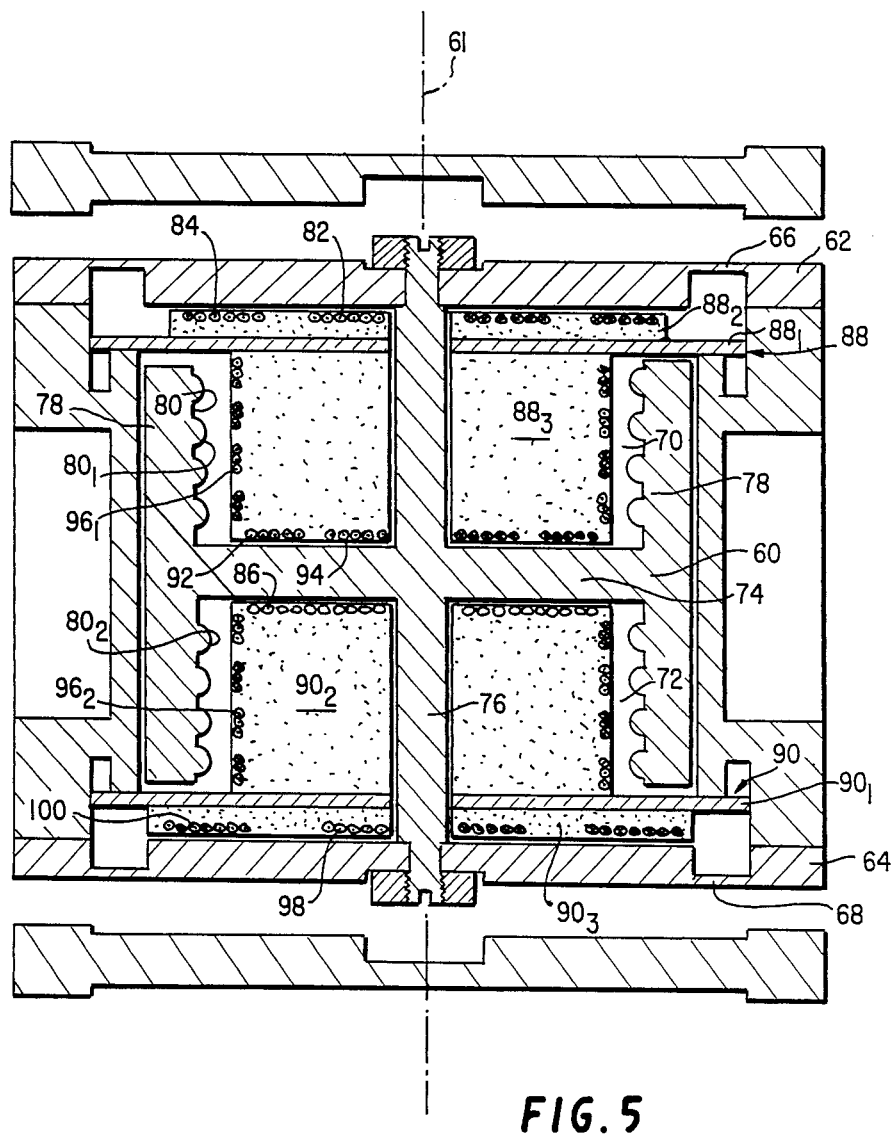
FIG. 5 a cross-sectional view illustrating the proof-mass and coils associated with a single accelerometer of a component gradiometer according to the present invention.

FIG. 5 is a cross-sectional view of an accelerometer of a component gradiometer according to the invention. Each accelerometer includes a proof mass 60 made of a superconducting material, such as Nb. The proof mass 60 is generally cylindrical and symmetrical around a longitudinally extending central axis 61. Proof mass 60 includes upper and lower flanges 62 and 64 having mechanical spring 66 and 68, respectively. The body of the proof mass has generally annular hollowed out portions 70 and 72 separated by an annular dividing partition 74 integrally formed with the central longitudinally extending post 76. Integrally connected to the dividing partition 74 is an outer wall 78 which is generally cylindrical, except for its inner surface 80 which is provided with disk-like projections $80_1$ and $80_2$ having a semi-circular cross-section.

Mounted adjacent a bottom-side surface of the upper flange 62 are common mode and differential mode gravity gradient sensing coils 82 and 84, respectively. Mounted adjacent a bottom-side surface of the dividing partition 74 is a levitation coil 86. Coils 82, 84 and coil 86 are mounted on annular coil forms 88 nd 90, respectively. Coil form 88 includes machinable glass ceramic support $88_2$ mounted on superconducting support plate $88_1$, while coil form 90 likewise includes machinable glass ceramic support $90_1$ mounted on superconducting support plate $90_2$.

Also mounted on support plate 88, via machinable glass ceramic support $88_3$ are misalignment sensing coils 92 and 94, discussed hereinafter. Wound around the periphery of support $88_3$ are negative spring coils $96_1$, discussed hereinafter. Similarly, mounted on support plate 90, via machinable glass ceramic support $90_3$ are misalignment adjustment coil 98 and levitation adjustment coil 100. Wound around the periphery of support $90_2$ are additional negative spring coils $96_2$ Coils 82, 84, 86, 92, 94, 98 and 100 are "pancake-shaped" coils wound out of thin (0.076 mm in diameter) Nb wire in a single layer. The coil form supports $88_2$, $88_3$, $90_2$ and $90_3$ are made of machinable glass ceramic (Macor ™, Corning Glass Works, Corning, New York), whose thermal expansion coefficient matches closely with that of Nb down to cryogenic temperatures. In each case, a continuous length of insulated Nb wire is wound uniformly on the flat support in a spiral shape. Low viscosity epoxy (TRA-CAST BBV 3002 epoxy, TRACON, Inc., Medford, Massachusetts) is used to bond the Nb wire to the respective support. Coils $96_1$ and $96_2$ are similarly made of Nb wire, but are wound around the circumference of the respective supports $88_3$ and $90_2$ As shown in FIG. 5, the sensing coils 82 and 84 are arranged in substantially the same plane adjacent the superconducting bottom surface of the upper flange 62. As a result, magnetic fields produced by these coils, i.e., those magnetic fields of any appreciable field strength, are produced between the respective coils 82 and 84 and the upper flange 62. There is virtually no magnetic field coupling between the common mode sensing coil 82 and the differential mode sensing coil 84, which permits independent balancing of the superconducting common mode and differential mode circuits, discussed hereinafter, and completely independent detection of common mode acceleration and differential mode gravity gradient.

Another important feature of the present invention shown in FIG. 5 is that the sensing coils 82, 84 and the levitation coil 86 are located on the "same" side of the proof mass. More particularly, coils 82 and 84 are located adjacent a bottom-side surface of flange 62, while levitation coil 86 is located adjacent a bottom-side surface of the partition 74. Thus, both coils 82, 84 and coil 86 are on the same side of the proof mass in relation to Earth's gravity force applied to the proof mass. This has significance from a temperature compensation standpoint, because temperature increases will cause the superconducting surface within the superconducting proof mass to recede a finite distance within the proof mass. The equivalent effect is to increase the separation distance between the levitation coil 86 and the partition 74 of the proof mass, thereby decreasing the levitation force acting on the proof mass by the coil 86. This causes physical sagging, under Earth's gravity force, of the proof mass towards the levitation coil until the superconducting surface of the partition 74 is sufficiently close to the levitation coil for levitation to occur at a decreased spacing between the partition 74 and the levitation coil 86. Sagging of the proof mass in this way, however, correspondingly results in the sensing coils 82, 84 being closer to the upper flange 62 by the same amount so as to compensate for the temperature-induced recession of the superconducting surface within the proof mass. The net effect is that the inductances of coils 82, 84 remain the same and unaffected by temperature increases.

Figure 6A:
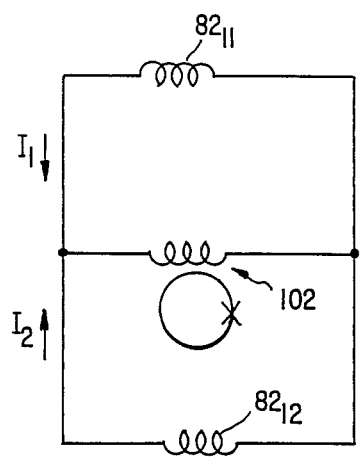
FIGS. 6a and 6b are schematic circuit diagrams of the superconducting common mode and differential mode gravity gradient sensing circuits of the present invention.
Figure 6B:
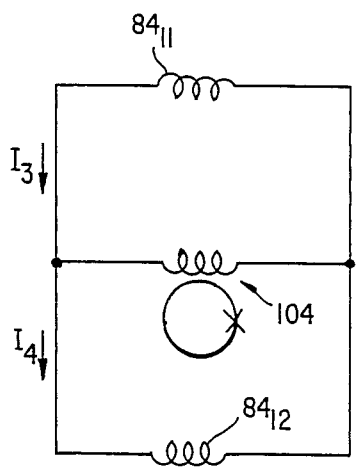

FIGS. 6a and 6b illustrate the superconducting circuits by which common mode and differential mode signals indicative of a platform acceleration and a gravity gradient, respectively, are obtained. As seen in FIG. 6a, common mode sensing coils $82_{11}$ and $82_{12}$ (where the subscripts refer to a particular component gradiometer and the accelerometers of that component gradiometer) are connected in parallel across a common mode sensing SQUID 102. Coils $82_{11}$ and $82_{12}$ conduct respective superconducting persistent currents $I_1$ and $I_2$ which are additively applied to SQUID 102. SQUID 102 in turn outputs a voltage signal proportional to the sum of $I_1$ and $I_2$. On the other hand, in the differential mode sensing circuit shown in FIG. 6b, persistent currents $I_3$ and $I_4$ which are initially established in coils $84_{11}$ and $84_{12}$ in the directions shown, are differentially applied to the SQUID 104, which outputs a voltage proportional to the difference between $I_3$ and $I_4$. Persistent currents $I_1$, $I_2$, $I_3$ and $I_4$ are stored in the respective inductors using selectively operated heat switches (not shown), using well known techniques as described, for example, by Chan et al, "Superconducting Gravity Gradiometer for Sensitive Gravity Measurements", *Physical Review D Particles and Fields*, Vol. 35, No. 12, pp. 3551-3597 (June 15, 1987).

Because the common mode and differential mode sensing circuits are independent of each other, and because the coils 82 and 84 have virtually no magnetic coupling, it is possible to balance out each unwanted mode independently when establishing the persistent currents $I_1$–$I_4$ flowing in the respective circuits. Differential mode balance in the common mode sensing circuit is achieved by physically rotating the gradiometer assembly and balancing $I_1$ and $I_2$ Common mode balance in the differential mode sensing circuit is achieved by physically moving the gradiometer assembly linearly and balancing $I_3$ and $I_4$.

As can be seen by inspection of FIGS. 6a and 6b, the common mode and differential mode sensing circuits are identical. The only difference in operation between the two circuits is the direction in which the respective persistent currents are originally stored. This feature provides a level of redundancy, whereby, in the event of a failure in one of the circuits, the remaining operative circuit can be sequentially operated in either a common mode sensing mode or a differential mode sensing mode simply by sequentially reversing one of the stored persistent currents in the operative circuit.

Figure 7:
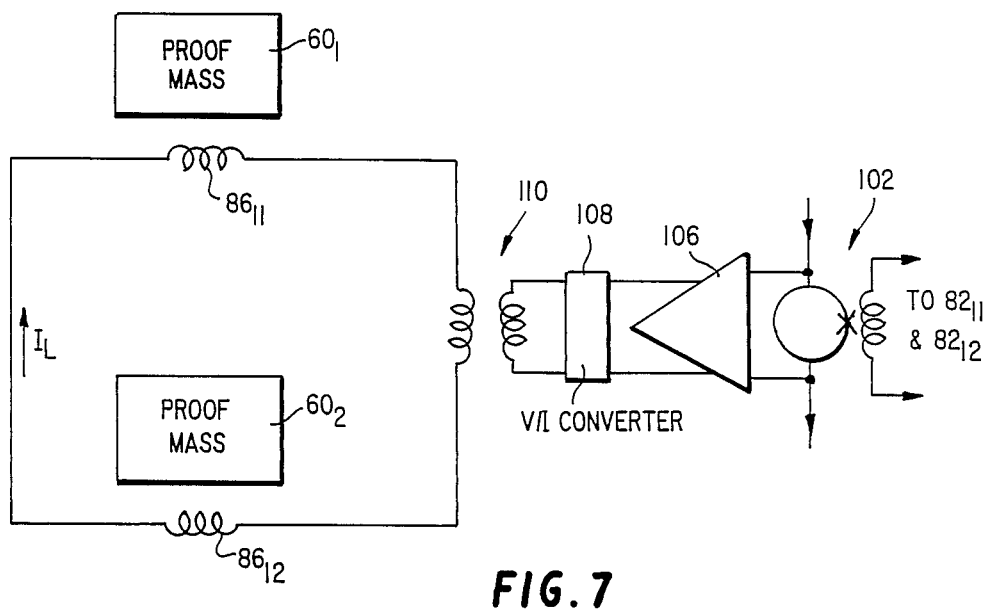
FIG. 7 is a schematic circuit diagram illustrating the superconducting push-pull levitation circuit of the invention, including provision for common mode force rebalance of the proof-mass.

FIG. 7 is a schematic circuit diagram of the superconducting levitation circuit of one component gradiometer of the invention, including provision for common mode force rebalance. As shown in FIG. 7, levitation coils $86_{11}$ and $86_{12}$ (again using the same subscript notation to refer to component gradiometer/accelerometer) are connected in series with an output of the common mode SQUID 102 coupled to the series circuit by way of amplifier 106, voltage/current converter 108 and transformer 110. Levitation coils $86_{11}$ and $86_{12}$ are thus arranged in a "push-pull" configuration, with the common mode force rebalance provided by transformer coupling of the common mode signal providing additional stiffness against common mode acceleration resulting in smaller displacement of the proof masses $60_1$, $60_2$. This contributes to improved dynamic range and allows the gradiometer to withstand higher accelerations.

In analyzing the levitation circuit shown in FIG. 7, it is assumed that the inductances $L_1$ and $L_2$ of coils $86_{11}$ and $86_{12}$ are given by:

$$L_1 = \Lambda_L d_{L1}; L_2 = \Lambda_L d_{L2},$$

where $\Lambda_L$ is a constant and coils $86_{11}$ and $86_{12}$ have the same dimensions and geometry and are perfectly matched, and where $d_{L1}$ and $d_{L2}$ represent the distances of coils $86_{11}$ and $86_{12}$ from proof masses $60_1$ and $60_2$, respectively.

Stated differently, $$L_1 = \Lambda_L(d_{L1}° + x_1); L_2 = \Lambda_L(d_{L2}° + x_2)$$

where $d_{L1}°$ and $d_{L2}°$ are equilibrium spacings, and $x_1$ and $x_2$ are proof mass displacements from the equilibrium positions, respectively. In other words, external gravitational forces displace proof masses $m_1$ and $m_2$ by $x_1$ and $x_2$ from $d_{L1}°$ and $d_{L2}°$ respectively. The electromagnetic potential energy of the levitation circuit is given by:

$$E = \frac{\phi_L^2}{2(L_1 + L_2)}.$$

where $\phi_L = (L_1 + L_2)I_L$ is the flux in $L_1$ and $L_2$, which is a constant. For common mode acceleration, $x_1 = x_2 \equiv x_c$. Then, $L_1 + L_2 = \Lambda_L(d_{L1}°d_{L2}° + 2x_c)$.

$$E = \frac{\phi_L^2}{2\Lambda_L(d_{L1}° + d_{L2}° + 2x_c)}$$

-continued
$$= E_o - 2F_L x_c + \tfrac{1}{2}k_{Ec}x_c^2 + \ldots$$

where $E_o$ is the stored energy in the circuit in equilibrium, $-2F_L x_c$ is the work done against the levitation force of the proof masses and $\tfrac{1}{2}k_{Ec}x^2$ is the work done against the electrical restoring force, $-k_{Ec}x_c$.

Here $2F_L = -\left.\dfrac{\partial E}{\partial x_c}\right|_{x_c=0} = \dfrac{\phi_L^2}{\Lambda_L(d_{L1}° + d_{L2}°)}$, $$k_{Ec} = \left.\dfrac{\partial^2 E}{\partial x_c^2}\right|_{x_c=0} = \dfrac{4\phi_L^2}{\Lambda_L(d_{L1}° + d_{L2}°)^3}.$$

The electrical restoring force adds additional "stiffness" against common mode acceleration, resulting in smaller displacements of the proof masses, thereby contributing to improved dynamic range and an ability of the gradiometer to withstand higher platform acceleration. Thus, for common mode signals, the "push-pull" levitation circuit provides an "electrical spring" component, with the attendant advantage described.

For differential mode, however, it is desirable to have a weak "electrical spring" to obtain higher sensitivity. For the differential mode, $$x_1 = -x_2 \equiv x_d, \text{ and}$$

$$E = \frac{\phi_L^2}{\Lambda_L(d_{L2}° + d_{L2}°)} \equiv E_o.$$

Therefore, $k_{Ed} = 0$, and it is seen that the "electrical spring" produced by "push-pull" levitation does not increase stiffness to differential mode acceleration, maintaining high differential mode sensitivity.

The above analysis is only valid insofar as the assumption that the inductances of the "pancake" coils are linear functions of spacings: $L_1 = \Lambda_L d_{L1}$ and $L_2 = \Lambda_L d_{L2}$. As seen in FIG. 5, this assumption is valid because of the fact that the levitation coil 86 of each gradiometer is located a sufficiently far distance from the superconducting support plate $90_1$ so that the plate $90_1$ does not influence the inductance of coil 86. By providing the hollowed out portion 72 and mounting the coil 86 on the ceramic support $90_2$ at a sufficiently far distance from the plate $90_1$, the present invention assures that the support plate $90_1$ does not affect the inductance of coil 86, and that the above analysis is valid.

In the inventor's earlier gradiometer described in the publications identified in the above-described field of the invention, the proof masses were not provided with the hollowed out portions of the same depth of portions 70, 72. As a result, the stray inductance arising from the proximity of the superconducting coil to the support of the earlier gradiometer introduced a non-linear term into the inductance equations of the levitation coils. The result was that the differential mode resonance frequency resulting from the mechanical spring and the electrical spring was in the range of 9–10 Hz, unacceptably large. The proof mass of the present invention results in a differential mode resonance frequency of approximately 5–6 Hz, to a point where it is sufficiently low so as to be substantially canceled by the superconducting negative spring of the invention, discussed hereinafter. The net effect is a substantially reduced net spring constant (mechanical spring constant minus negative spring constant). A reduced net spring constant to differential mode means that differential gravity gradients produce larger proof mass displacement, so that the three-axis gradiometer becomes a more sensitive device. In fact, it can be shown that the design of the present invention improves differential mode sensitivity by a factor of approximately 50, a significant improvement.

The superconducting negative spring of the invention, above-noted, is implemented by way of the annular disk-like projections $80_1$, $80_2$ provided on the inside surface 80 of the outer wall 78 of the proof mas 60, in conjunction with the coils $96_1$, $96_2$ located adjacent thereto. Basic principles of operation of a superconducting negative spring are described in Moody et al, "Superconducting Gravity Gradiometer For Space and Terrestial Applications", J. Appl. Phys. Vol. 60, No. 12, pp. 4308-4315, (Dec. 15, 1986). However, earlier proof mass designs did not include the hollowed out portions 70, 72 defined in large part by cylindrical wall 78, as a result of which the semi-circular projections of the negative spring were formed on the outer wall, i.e., an exterior surface, of the proof mass. This meant that the negative spring coils of the earlier gradiometer had to be positioned on an inner cylindrical surface of an exterior coil form holder, a design which is quite difficult, if not impossible, to implement from a mechanical standpoint. The proof mass design of the present invention solves the problem by providing hollowed out portions 70, 72 and by providing the disk-like projections $80_1$, $80_2$ in the inner surface 80 of the cylindrical wall 78. This design enables the superconducting negative spring coils $96_1$, $96_2$ to be wound on the outer cylindrical surfaces of coil forms $88_3$, $90_2$, thereby to make the mechanical implementation of the superconducting negative spring feasible.

Each of the coils $96_1$ and $96_2$ includes plural series connected sections arranged adjacent corresponding surfaces of the disk-like projections $80_1$ and $80_2$. Winding of the adjacent sections of coils $96_1$ and $96_2$ are physically inverted to produce magnetic fluxes in opposite directions. This opposing magnetic fluxes increase magnetic field gradients near the disk-like projections $80_1$ and $80_2$ and thereby increase the magnitude of the resultant negative spring constant by as much as 20%.

The negative spring coils $96_1$ and $96_2$ are connected in series and closed to form a superconducting loop. A persistent current $I_N$ stored in this loop is adjusted until a desired resonance frequency is obtained for each accelerometer. In order to obtain a complete cancellation of the temperature-induced error in each component gradiometer by locating the differential mode sensing coils on the same side as the levitation coils, as discussed earlier, the uncoupled resonance frequencies of the two component accelerometers need to be matched. The uncoupled resonance frequency of each accelerometer is measured with the common mode or differential mode sensing circuit by having the proof mass of the conjugate accelerometer "pinned" against one of its coils by means of a differential levitation circuit, to be discussed hereinafter. The persistent currents $I_N$ in the two negative spring coil loops are adjusted to obtain a precise match of the two uncoupled resonance frequencies of the respective accelerometers in each component gradiometer.

Referring again to FIG. 7, common mode force rebalance is next explained in more detail. Force rebalance, whether common mode or differential, is done to apply equal and opposite forces to each proof mass to keep the respective proof mass in its null position in the presence of a time varying gravity signal. As shown in FIG. 7, this is done for common mode force rebalance by taking an output from the common mode SQUID 102, amplifying it by means of amplifier 106, converting the output of amplifier 106 to a current by means of converter 108, and transformer coupling the current output of converter 108 into the series levitation circuit of levitation coils $86_{11}$ and $86_{12}$ (the particular component gradiometer is indicated by the first number of the subscript, and the accelerometer thereof indicated by the second subscript number). This circuit (FIG. 7) is repeated for each component gradiometer. If $i_{cF}$ is the current at the output of converter 108, and if $i_{cF}'$ is the force rebalance current transformer coupled back into the levitation circuit, then the force on the proof masses of a component gradiometer is F, given by $$F = \frac{\Lambda_L (I_L + i_{cF}')^2}{2}$$

Ignoring higher order terms then:

$$F = \tfrac{1}{2}\Lambda_L I_L^2 + \Lambda_L i_{cF}' I_L$$

The term $\tfrac{1}{2}\Lambda_L I_L^2$ corresponds to the levitation force $F_L$ applied to each proof mass. The term $\Lambda_L i_{cF}' I_L$ corresponds to the rebalance force. However, $i_{cF}'$ is proportional to $i_{cF}$, which is in turn proportional to $g_c \equiv (g_1+g_2)/2$, equivalent common mode acceleration: $i_{cF}' = bg_c$, where b is a constant. In order to apply equal and opposite common mode rebalance force $-mg_c$, $\Lambda_L bI_L$ should then be chosen to equal $-m$, where m equals the mass of proof mass 60.

Figure 8A:
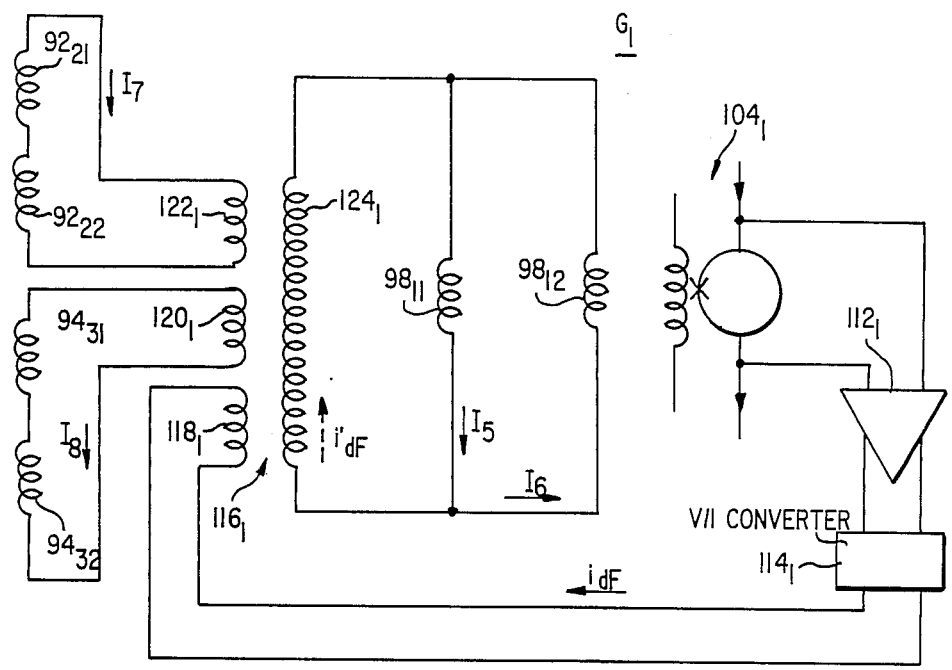
FIGS. 8a, 8b and 8c are schematic circuit diagrams of the superconducting circuits employed according to the invention for differential mode force rebalance and residual sensitive axis angular misalignment compensation.
Figure 8B:
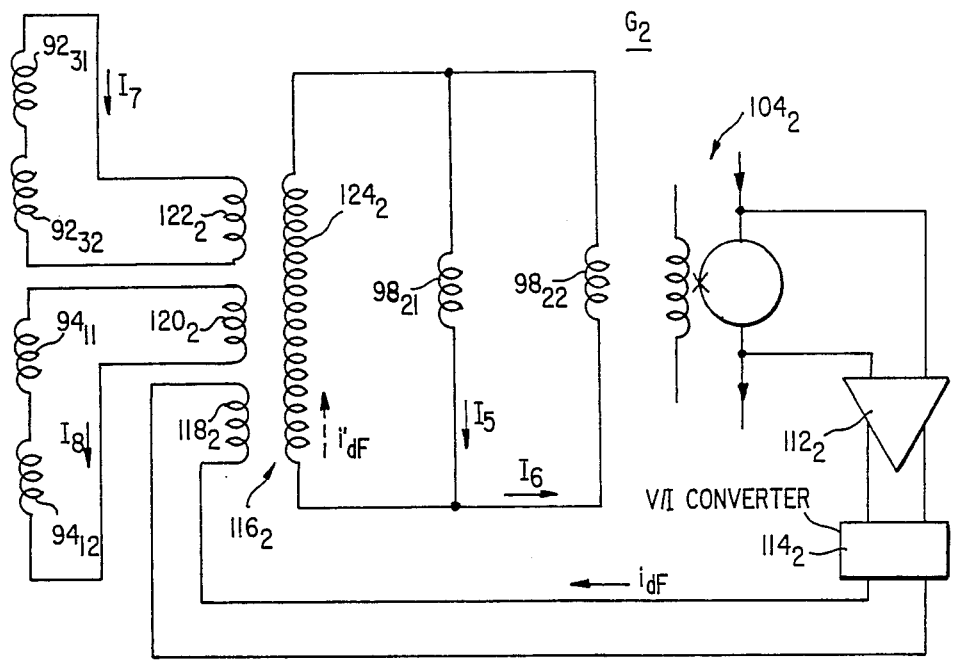
Figure 8C:
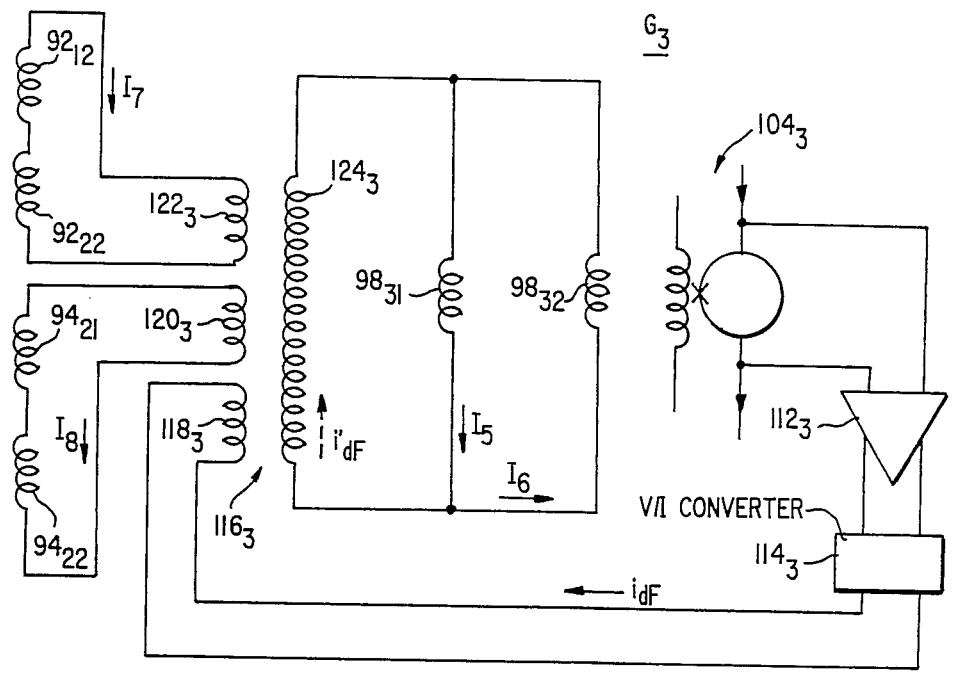

Referring now to FIGS. 8a, 8b and 8c, there are shown schematic circuit diagrams of the superconducting circuits employed according to the invention for differential mode force rebalance and residual sensitive axis angular misalignment compensation. Differential mode force rebalance likewise is performed in order to apply equal and opposite forces to each proof mass so that each proof mass will be kept at the null position in the presence of a time varying gravity signal.

Differential mode force rebalance is achieved for a first component gradiometer $G_1$ formed by accelerometers $G_{11}$ and $G_{22}$ by amplifying a signal obtained from the differential mode SQUID $104_1$ of $G_1$ by means of amplifier $112_1$, converting the voltage output of amplifier $112_1$ to a current by means of converter $114_1$ and transformer coupling by means of a primary coil $118_1$ of tranformer $116_1$ the converted current signal into a superconducting circuit formed by the secondary coil $124_1$ connected in parallel with misalignment adjustment coils $98_{11}$ and $98_{12}$ of accelerometers $G_{11}$ and $G_{12}$, respectively, as shown in FIG. 8a. Differential mode force rebalance is likewise achieved for the other component gradiometers, $G_2$ and $G_3$, as shown in FIGS. 8b and 8c, respectively.

For a perfectly balanced system shown in FIG. 8a, the current flowing in each of coils $98_{11}$ and $98_{12}$ is equal (coils $98_{11}$ and $98_{12}$ being ideally of identical construction), i.e., $I_5 = I_6 = I_B$. Further, assume that the current at the output of converter $114_1$ is $i_{dF}$, which produces a current $i_{dF}'$ in the secondary coil $124_1$ of transformer $116_1$. Then the forces $F_1$ and $F_2$ exerted by the respective coils $98_{11}$ and $98_{12}$ against the respective proof masses $60_1$ and $60_2$ (not shown) are given by:

$$F_1 = -\tfrac{1}{2}\Lambda_B(I_B + \tfrac{1}{2}i'_{dF})^2,$$

$$F_2 = -\tfrac{1}{2}\Lambda_B(I_B - \tfrac{1}{2}i'_{dF})^2,$$

since $i'_{dF}$ is divided equally into the identical coils $98_{11}$ and $98_{12}$.

Expanding the above equations for $F_1$ and $F_2$ into geometric series and ignoring higher order terms, $F_1$ and $F_2$ become:

$$F_1 = -\tfrac{1}{2}\Lambda_B I_B^2 - \tfrac{1}{2}\Lambda_B I_B i'_{dF},$$

$$F_2 = -\tfrac{1}{2}\Lambda_B I_B^2 + \tfrac{1}{2}\Lambda_B I_B i'_{dF}.$$

The feedback current $i'_{dF}$ is proportional to $i_{dF}$, which is in turn proportional to $g_d$, where $g_d \equiv g_2 - g_1$ is the equivalent differential acceleration applied to the proof masses which results in a differential displacement of the proof masses $60_1$ and $60_2$. Therefore, $i_{dF}' = cg_d$, where c is a constant, so that $$F_1 = -\tfrac{1}{2}\Lambda_B I_B^2 - \tfrac{1}{2}(\Lambda_B I_B c) g_d,$$

$$F_2 = -\tfrac{1}{2}\Lambda_B I_B^2 + \tfrac{1}{2}(\Lambda_B I_B c) g_d,$$

where $-\tfrac{1}{2}\Lambda_B I_B^2$ corresponds to a negative correction to the levitation force.

If c is chosen so that $\Lambda_B I_B c = -m$, the mass of the proof mass, then $F_2 - F_1 = -mg_d$ which is equal and opposite to the differential gravity force. Thus a differential force rebalance is achieved.

A relative tilt of the sensitive axes of the component accelerometers within each component gradiometer results in a residual coupling of the gradiometer to cross component common mode accelerations, as shown by Chan et al, in the publication cited above. Residual balance to compensate for this sensitive axis angular misalignment is performed according to the invention by using persistent currents in superconducting loops that connect the component gradiometers to each other, as described hereinafter. In this way the present invention applies common acceleration forces which are equal and opposite to the residual common acceleration signals produced due to sensitive axis angular misalignment. Accordingly, the present invention employs passive feedback using presistent currents which are stable and noise-free for the residual sensitive axis misalignment compensation.

Figure 9A:
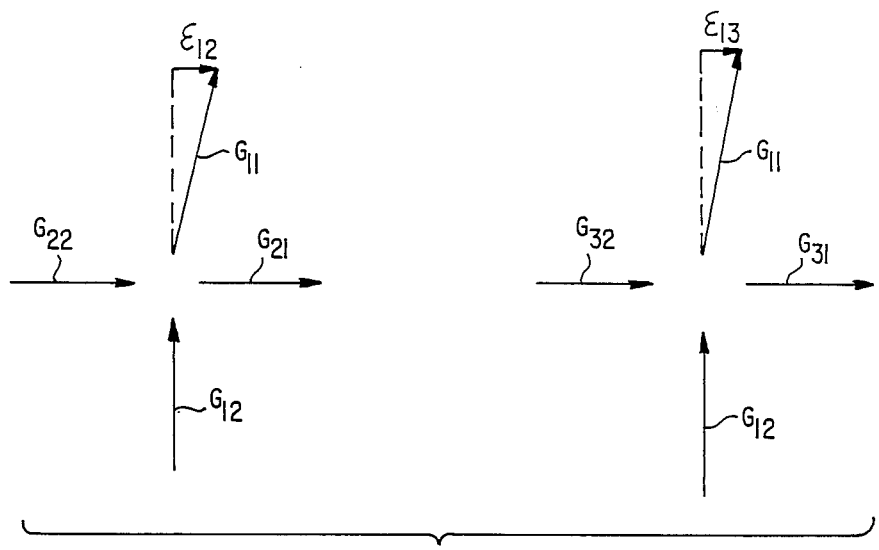
FIGS. 9a, 9b and 9c are schematic vector diagrams illustrating the principle of residual sensitive axis angular misalignment compensation performed according to the invention.
Figure 9B:
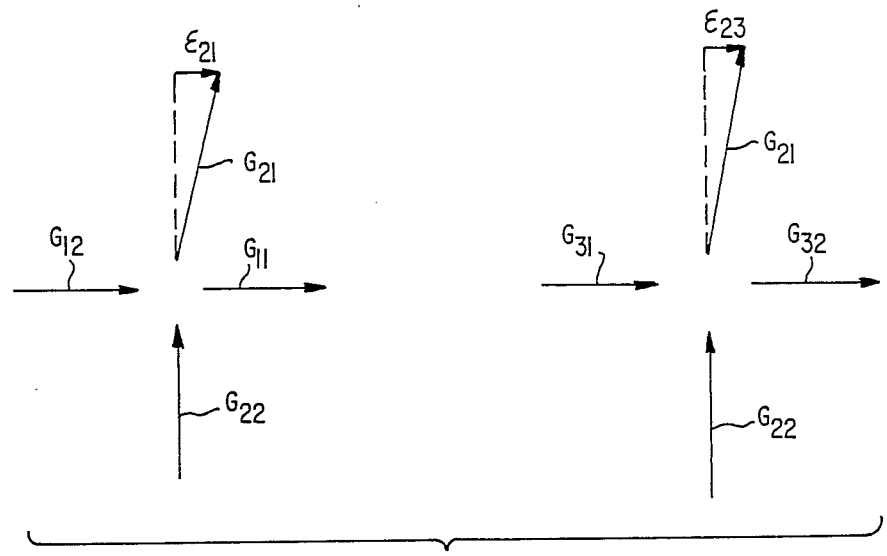
Figure 9C:
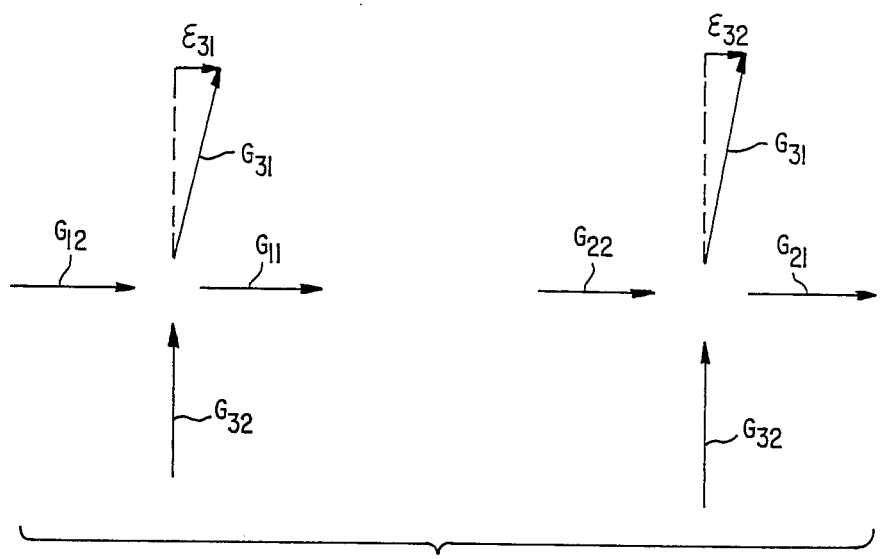

FIG. 9a illustrates vector diagrams showing sensitive axis angular misalignments of accelerometer $G_{11}$, with respect to accelerometer $G_{12}$, in the direction of the sensitive axes of accelerometers $G_{21}$ and $G_{22}$ of component gradiometer $G_2$, and in the direction of the sensitive axes of accelerometers $G_{31}$ and $G_{32}$ of component gradiometer $G_3$. It is readily understood from FIG. 9a that accelerometer $G_{11}$ will pick up a linear acceleration error component $\epsilon_{12}$ in the direction of the sensitive axes of component gradiometer $G_2$. Similarly, sensitive axis angular misalignment of gradiometer $G_1$ in the direction of component gradiometer $G_3$ will result in a linear acceleration error component $\epsilon_{13}$ picked up by component gradiometer $G_1$ in the direction of the sensitive axes of component gradiometer $G_3$. Similar effects are realized as a result of sensitive axis angular misalignment of component gradiometers $G_2$ and $G_3$, as schematically shown in FIGS. 9b and 9c.

According to the invention, sensitive axis angular misalignment is compensated for, as shown in FIG. 8a for gradiometer $G_1$, by connecting misalignment sensing coils $92_{21}$ and $92_{22}$ in a superconducting loop with primary coil $122_1$ and by connecting the misalignment sensing coils $94_{31}$ and $94_{32}$ in a superconducting loop with primary coil $120_1$. Then, persistent currents $I_7$ and $I_8$ are set in the respective loops with respective values so that any angular misalignment in gradiometer $G_1$ is completely balanced out. This balance is achieved by adjusting $I_7$ and $I_8$ until the output of gradiometer $G_1$ becomes zero while linear acceleration components are applied to the gradiometer platform in the directions of the sensitive axes of gradiometers $G_2$ and $G_3$. Similarly, sensitive axis angular misalignment compensation for gradiometers $G_2$ and $G_3$ is carried out by means of corresponding superconducting loops shown in FIGS. 8b and 8c, respectively.

An error in concentricity of the component accelerometers within each component gradiometer results in another kind of error in the gradiometer: a residual coupling to angular accelerations, as shown by Chan et al in the publication cited above. This type of sensitive axis linear misalignment is compensated for according to the invention by displacing the accelerometers with respect to each other by means of, for example, piezoelectric transducers or persistent current loops.

Figure 10:
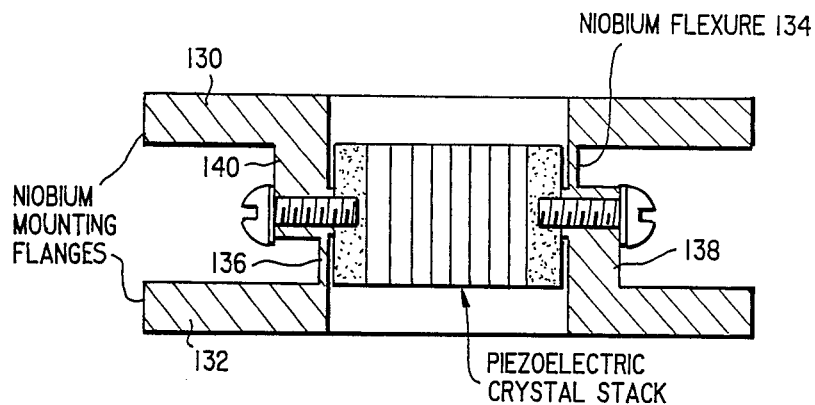
FIG. 10 is a cross-sectional view of the axis aligner with a piezoelectric crystal stack employed according to the invention to remove residual sensitive axis linear misalignment.

FIG. 10 is a cross sectional view of the piezoelectric axis aligner. Two parallel circular mounting flanges 130, 132 are connected through two thin planar flexures 134, 136 and adjoining columns 138, 140. A piezoelectric crystal stack, Physik Instrumente Model P-241 HL-Translator, is inserted between the two flexures 134, 136 and columns 138, 140 which extend from the two mounting flanges, as shown in FIG. 10. By applying an electric field across the piezoelectric crystal stack, the two flanges 130, 132 can be displaced relative to each other by up to 10 μm which is sufficient to obtain sensitive axis linear alignment. As shown in FIG. 10, the upper flange 130 displaces to right with respect to the lower flange 132 due to the transverse positioning of the flexures 134, 136 and columns 138, 140, as shown. A precise axis alignment is achieved by adjusting the dc voltage across the piezoelectric transducer until the output of the component gradiometer becomes zero while angular acceleration components perpendicular to the sensitive axes of the component accelerometers are applied.

Figure 11:
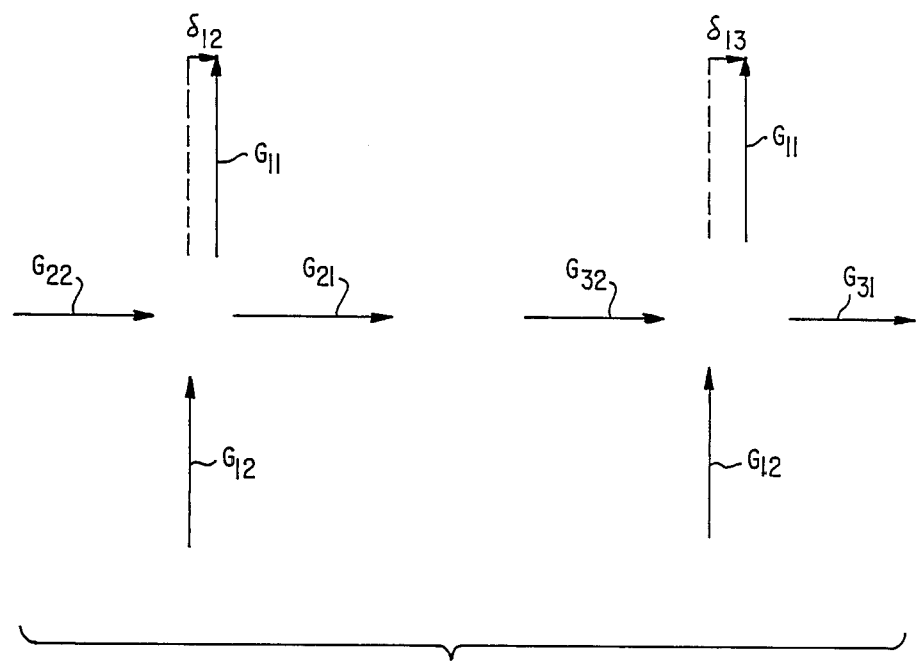
FIG. 11 is a schematic vector diagram illustrating the principle of residual sensitive axis linear misalignment compensation of the invention.

FIG. 11 are two vector diagrams illustrating sensitive axis linear misalignments of accelerometer $G_{11}$, with respect to accelerometer $G_{12}$, in the directions of the sensitive axes of component gradiometers $G_2$ and $G_3$. It is clear from FIG. 11 that component gradiometer $G_1$ will pick up angular acceleration error components in the directions of the sensitive axes of component gradiometers $G_3$ and $G_2$ with proportionality constant $\delta_{12}$ and $\delta_{13}$, respectively. Similar effects are realized as a result of sensitive axis linear misalignment of component gradiometers $G_2$ and $G_3$.

According to the invention, one way to compensate for sensitive axis linear misalignment is by means of piezoelectric axis aligner; as shown in FIG. 10. Two such axis aligners, with displacement axes oriented orthogonal to each other, are needed to obtain a two-dimensional axis alignment for each component gradiometer. In order to obtain full alignment for a three-axis gradiometer, one axis aligner with a proper orientation is inserted between each accelerometer and the mounting cube, shown in FIG. 4, with a total of six axis aligners for the system.

An alternative embodiment which permits a noise-free linear displacement of the sensitive axes is by means of superconducting coils, which replaces the piezoelectric crystal stack in FIG. 10, and are applied to the opposing faces of flexure 136/column 140 and flexure 134/column 138. Using the strong magnetic force produced by a persistent current, as in the levitation of the proof masses, one can obtain the sensitive axis linear alignment by means of a superconducting circuit. The alignment procedure is similar to that used for angular misalignment compensation except that, for the present case, the sensitivity of the gradiometer to angular accelerations is nulled.

Upon start-up of the gradiometer of the invention, it is possible that one or the other of the proof masses of component gradiometers might not be fully levitated or might be "pinned" against one of the coils at the top side, since at start-up there may be asymmetry in the spacing between the levitation coils 86 and proof mass 60 of accelerometers of each component gradiometer, and in the geometry of the levitation coils $86_{11}$ and $86_{12}$. As shown in FIG. 7, however, in the levitation superconducting circuit of the invention, the same current, $I_L$, flows through both levitation coils $86_{11}$, $86_{12}$ of the component gradiometer, and therefore any changes thereto will affect both accelerometers equally. In order to provide a capability to apply differential levitation forces to the proof-masses of each component gradiometer, each accelerometer is also provided with the levitation adjustment coil 100 previously noted.

Figure 12:
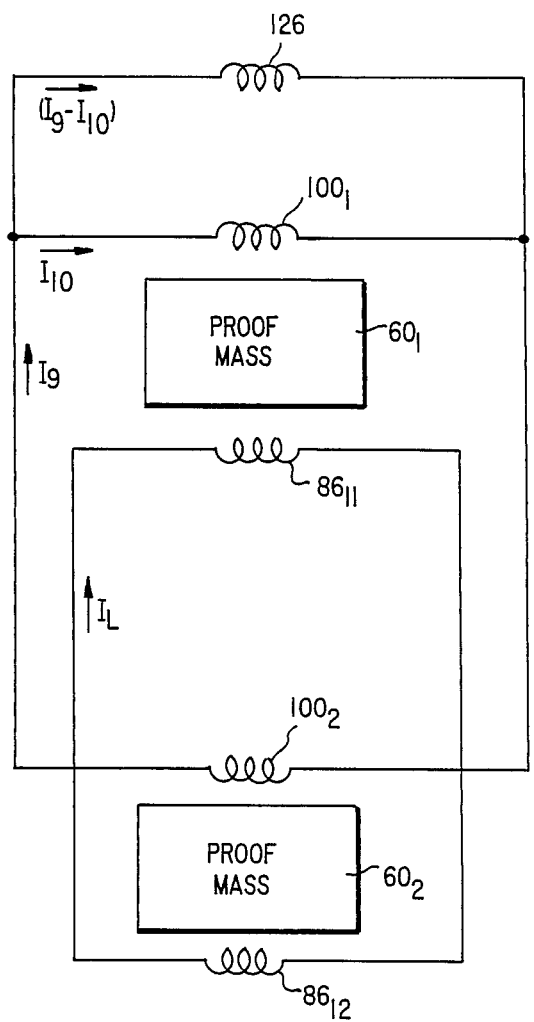
FIG. 12 is a schematic circuit diagram of a superconducting circuit used to establish differential levitation between the proof masses of a component gradiometer upon start-up of the three-axis gradiometer of the invention.

FIG. 12 is a schematic circuit diagram of a superconducting differential levitation circuit employed in each component gradiometer at start-up of the invention. In FIG. 12, coils $100_1$ and $100_2$ mounted adjacent proof masses $60_1$ and $60_2$, respectively, are connected in parallel with coil 126. Also shown is the superconducting levitation circuit including levitation coils $86_{11}$ and $86_{12}$ (the common mode force rebalance circuits 102, 106, 108 and 110 not being shown for the sake of convenience). Coil $100_2$ carries persistent current $I_9$ and coil $100_1$ carries persistent current $I_{10}$. Coil 126 carries persistent current $I_9 - I_{10}$.

The total levitation forces $F_{L1}$ and $F_{L2}$ exerted on the proof mass $60_1$ and $60_2$, respectively, are:

$$F_{L1} = \tfrac{1}{2}\Lambda_{L1}I_L^2 - \tfrac{1}{2}\Lambda_{D1}I_{10}^2$$

$$F_{L2} = \tfrac{1}{2}\Lambda_{L2}I_L^2 - \tfrac{1}{2}\Lambda_{D2}I_9^2$$

where $\Lambda_{L1} = \dfrac{L_{861}}{d_{L1}}$; $\Lambda_{L2} = \dfrac{L_{862}}{d_{L2}}$; $\Lambda_{D1} = \dfrac{L_{1001}}{d_{D1}}$;

$\Lambda_{D2} = \dfrac{L_{1002}}{d_{D2}}$;

where $L_{861}$ and $L_{862}$ are the inductances of coils $86_1$ and $86_2$, respectively; $d_{L1}$ is the spacing between coil $86_1$ and proof mass $60_1$; $d_{L2}$ is the spacing between coil $86_2$ and proof mass $60_2$; $L_{1001}$ and $L_{1002}$ are the inductances of coils $100_1$ and $100_2$, respectively; $d_{D1}$ is the spacing between coil $100_1$ and proof mass $60_1$, and $d_{D2}$ is the spacing between coil $100_2$ and proof mass $60_2$.

$I_9$ and $I_{10}$ are chosen so that, if there is asymmetry in proof mass/levitation coil spacing at start-up ($d_{L1} \neq d_{L2}$) or in levitation coil geometry ($\Lambda_{L1} \neq \Lambda_{L2}$), the differential levitation forces produced by currents $I_9$ and $I_{10}$ in coils $100_2$ and $100_1$, respectively, remove the asymmetry and produce balanced levitation of the proof masses of each component gradiometer so that both proof masses are made free, i.e., not "pinned", simultaneously.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gradiometer having a sensitive axis for detecting a gravity gradient along the sensitive axis, comprising:
   a pair of accelerometers having respective sensitive axes;
   each accelerometer including a proof mass having a pair of hollowed out annular portions;
   each proof mass having at least one sensing coil arranged adjacent a bottom-side surface of the respective proof mass in one of the hollowed out portions and a levitation coil arranged adjacent a second bottom-side surface of the respective proof mass in the other hollowed out portion, said at least one sensing coil and said levitation coil thus being located on the same side of the respective proof mass in relation to the direction of an external force exerted on said gradiometer thereby to compensate for temperature induced changes in magnetic field penetration into the respective proof mass;
   at least one first superconducting circuit in which the sensing coils of the accelerometers are interconnected and in which a first persistent current flows, said first circuit having an output indicative of a gravity gradient along the sensitive axis of the gradiometer; and
   a second superconducting circuit in which the levitation coils of the respective component gradiometer are series connected, said second circuit having stored therein a second persistent current by which the levitation coils exert respective forces against respective proof masses to levitate the respective proof masses.

2. The gradiometer according to claim 1, wherein each accelerometer comprises:
   a coil form arranged in said other hollowed out portion for supporting the levitation coil of the respective proof mass at a predetermined distance from said second bottom-side surface, said coil form comprising a superconducting support plate and an insulating support mounted on said support plate on one side of said support, said support having another side on which said levitation coil is mounted, the distance between said one and said another sides of said support being sufficiently large so that said support plate has negligible effect on the inductance of said levitation coil.

3. The gradiometer according to claim 1, comprising:
   each proof mass comprising a partition wall separating said pair of hollowed out portions and a generally cylindrical outer wall connected to said partition wall and at least partially surrounding said pair of hollowed out portions, said outer wall having a radially inner surface including plural disk-shaped projections each having a semi-circular cross-section;
   mechanical spring means coupled to each proof mass for applying a restraining force to each proof mass;
   each accelerometer including a pair of coil forms on which said sensing and levitation coils are respectively mounted, said coil forms each comprising a superconducting support plate and an insulating annular support mounted on said support plate and on which said sensing and levitation coils are mounted;

a pair of series connected superconducting negative spring coils wound around the peripheries of respective of said annular supports adjacent respective of said disk-like projections, said coils having plural sections with alternating directions of winding in respective sections of negative spring coils, said negative spring coils conducting persistent currents such that the negative spring coils and respective projections exhibit a negative spring constant to counterbalance the spring constant of said mechanical spring means.

4. The gradiometer according to claim 3, wherein in each accelerometer the coil form support on which said levitation coil is mounted has one side adjacent said support plate and one side on which the levitation coil is mounted, and the distance between the sides of said support is sufficiently large so that the support plate has negligible effect on the inductance of said levitation coil.

5. The gradiometer according to claims 1 or 4, comprising:

the at least one sensing coil of each accelerometer comprising a common mode sensing coil and a differential mode sensing coil arranged laterally adjacent each other against and sufficiently close to said first bottom side surface so that magnetic field coupling between said common mode and differential mode sensing circuits is negligible.

6. The gradiometer according to claim 5, wherein said at least one first circuit comprises:

a common mode sensing circuit in which the common mode sensing coils of the accelerometers are connected in parallel with each other and with an input coil of a first superconducting quantum interference device (SQUID) amplifier and in which persistent currents are established in the common mode sensing coils in a direction so that the sum of the currents in the common mode sensing coils flows through the input coil of said first SQUID amplifier, said first SQUID amplifier having an output indicative of gravity and accelerations acting in the same direction upon the respective pair of proof masses; and a differential mode sensing circuit in which the differential mode sensing coils of the accelerometers are connected in parallel with each other and with an input coil of a second SQUID amplifier and in which persistent currents are established in the differential mode sensing coils in directions so that the difference of the currents flowing in the differential mode sensing coils flows through the input coil of said second SQUID amplifier, said second SQUID amplifier having an output indicative of gravity and accelerations acting in opposite directions on the respective pair of proof masses.

7. The gradiometer according to claim 6, further comprising common mode force rebalance means for applying equal and opposite forces to each proof mass upon subjection of each proof mass to a common gravity or acceleration signal, comprising, a transformer having a secondary coil connected in series with the levitation coils of the respective component gradiometer, and a primary coil coupled to the output of said first SQUID amplifier.

8. The gradiometer according to claim 7, further comprising:

differential mode force rebalance means for applying equal and opposite forces to each proof mass upon subjection of each proof mass to a differential gravity or acceleration signal, comprising, first and second rebalance coils mounted adjacent respective of said proof masses, said rebalance coils of the respective component gradiometer connected in parallel with each other, and a transformer having a secondary coil connected in parallel with the rebalance coils and a primary coil coupled to the output of said second SQUID amplifier.

9. The gradiometer according to claim 1, comprising:

each accelerometer further comprising a differential levitation coil arranged adjacent the proof mass of the respective accelerometer; and a differential levitation superconducting circuit in which the differential levitation coils of the respective accelerometers are connected in parallel with each other and with a differential current conducting coil, wherein respective persistent currents are stored in said differential levitation coils so that said differential levitation coils produce respective levitation forces on the respective proof masses and levitate the respective proof masses in combination with forces exerted by said levitation coils.

10. The gradiometer according to claim 5, comprising means for compensating for residual sensitive axis linear misalignment between the sensitive axes of said accelerometers 11. The gradiometer according to claim 10, wherein said residual sensitive axis linear misalignment compensating means comprises:

mounting supports on which respective of the accelerometers are mounted, each mounting support comprising a pair of parallel flanges separated by transverse walls, each wall including a column portion and a flexure portion thinner than said column portion, said flexure portions being non-equidistant from the flanges;

each mounting support provided with means for applying force to the walls of the mounting support to produce a relative transverse movement between said flanges due to bending of said walls at the flexure portions; and the supports of the accelerometers being arranged with the walls of one support perpendicular to the walls of the other support to obtain two dimensional linear misalignment compensation for the accelerometers.

12. The gradiometer according to claim 9, comprising means for compensating for residual sensitive axis linear misalignment between the sensitive axes of said accelerometers.

13. The gradiometer according to claim 12, wherein said residual sensitive axis linear misalignment compensating means comprises:

mounting supports on which respective of the accelerometers are mounted, each mounting support comprising a pair of parallel flanges separated by transverse walls, each wall including a column portion and a flexure portion thinner than said column portion, said flexure portions being non-equidistant from the flanges;

each mounting support provided with means for applying force to the walls of the mounting support to produce a relative transverse movement between said flanges due to bending of said walls at the flexure portions; and the supports of the accelerometers being arranged with the walls of one support perpendicular to the walls of the other support to obtain two dimensional linear misalignment compensation for the accelerometers.

14. A three-axis gradiometer comprising:

three component single-axis gradiometers arranged mutually orthogonal with respect to each other, each component gradiometer comprising a pair of accelerometers each having a sensitive axis;

each accelerometer including a proof mass having a pair of hollowed out annular portions;

each proof mass having at least one sensing coil arranged adjacent a bottom-side surface of the respective proof mass in one of the hollowed out portions and a levitation coil arranged adjacent a second bottom-side surface of the respective proof mass in the other hollowed out portion, said at least one sensing coil and said one levitaton coil thus being located on the same side of the respective proof mass in relation to the direction of an external force exerted on said gradiometer thereby to compensate for temperature induced changes in magnetic field penetration into the respective proof mass;

each component gradiometer including at least one first superconducting circuit in which the sensing coils of the respective component gradiometer are interconnected and in which a first persistent current flows, said first circuit having an output indicative of a gravity gradient along the sensitive axes of the accelerometers of the respective component gradiometer between said accelerometers; and each component gradiometer including a second superconducting circuit in which the levitation coils of the respective component gradiometer are series connected, said second circuit having stored therein a second persistent current by which the levitation coils exert respective forces against respective proof masses to levitate the respective proof masses.

15. The three-axis gradiometer according to claim 14, wherein each accelerometer comprises:

a coil form arranged in said other hollowed out portion for supporting the levitation coil of the respective proof mass at a predetermined distance from said second bottom-side surface, said coil form comprising a superconducting support plate and an insulating support mounted on said support plate on one side of said support, said support having another side on which said levitation coil is mounted, the distance between said one and said another sides of said support being sufficiently large so that said support plate has negligible effect on the inductance of said levitation coil.

16. The three-axis gradiometer according to claim 14, comprising:

each proof mass comprising a partition wall separating said pair of hollowed out portions and a generally cylindrical outer wall connected to said partition wall and at least partially surrounding said pair of hollowed out portions, said outer wall having a radially inner surface including plural disk-shaped projections each having a semi-circular cross-section;

mechanical spring means coupled to each proof mass for applying a restraining force to each proof mass;

each accelerometer including a pair of coil forms on which said sensing and levitation coils are respectively mounted, said coil forms each comprising a superconducting support plate and an insulative annular support mounted on said support plate and on which said sensing and levitation coils are mounted;

a pair of series connected superconducting negative spring coils wound around the peripheries of respective of said annular supports adjacent respective of said disk-like projections, said coils having plural sections with alternating directions of winding in respective sections of negative spring coils, said negative spring coils conducting persistent currents such that the negative spring coils and respective projections exhibit a negative spring constant to counterbalance the spring constant of said mechanical spring means.

17. The three-axis gradiometer according to claim 16, wherein in each accelerometer the coil form support on which said levitation coil is mounted has one side adjacent said support plate and one side on which the levitation coil is mounted, and the distances between the sides of said support is sufficiently large so that the support plate has negligible effect on the inductance of said levitation coil.

18. The three-axis gradiometer according to claims 14 or 17, comprising:

the at least one sensing coil of each accelerometer comprising a common mode sensing coil and a differential mode sensing coil arranged laterally adjacent each other against and sufficiently close to said first bottom side surface so that magnetic field coupling between said common mode and differential mode sensing circuits is negligible.

19. The three-axis gradiometer according to claim 18 wherein said at least one first circuit comprises:

a common mode sensing circuit in which the common mode sensing coils of each component gradiometer are connected in parallel with each other and with an input coil of a first superconducting quantum interference device (SQUID) amplifier and in which persistent currents are established in the common mode sensing coils in a direction so that the sum of the currents in the common mode sensing coils flows through the input coil of said first SQUID amplifier, said first SQUID amplifier having an output indicative of gravity and accelerations acting in the same direction upon the respective pair of proof masses; and a differential mode sensing circuit in which the differential mode sensing coils of each component gradiometer are connected in parallel with each other and with an input coil of a second SQUID amplifier and in which persistent currents are established in the differential mode sensing coils in directions so that the difference of the currents flowing in the differential mode sensing coils flows through the input coil of said second SQUID amplifier, said second SQUID amplifier having an output indicative of gravity and accelerations acting in opposite directions on the respective pair of proof masses.

20. The three-axis gradiometer according to claim 19, further comprising
common mode force rebalance means for applying equal and opposite forces to each proof mass upon subjection of each proof mass to a common gravity or acceleration signal, comprising,
each component gradiometer including a transformer having a secondary coil connected in series with the levitation coils of the respective component gradiometer, and
a primary coil coupled to the output of- said first SQUID amplifier.

21. The three-axis gradiometer according to claim 19, further comprising:
differential mode force rebalance means for applying equal and opposite forces to each proof mass upon subjection of each proof mass to a differential gravity or acceleration signal, comprising,
each component gradiometer including,
first and second rebalance coils mounted adjacent respective of said proof masses, said rebalance coils of the respective component gradiometer connected in parallel with each other, and
a transformer having a secondary coil connected in parallel with the rebalance coils and at least a first primary coil coupled to the output of said second SQUID amplifier.

22. The three-axis gradiometer according to claim 21, further comprising:
residual axis angular misalignment compensation means for compensating for angular misalignment of the sensitive axes of the accelerometers of each component gradiometer, including,
each accelerometer having a pair of compensation coils arranged adjacent each proof mass,
each said transformer of said differential mode force rebalance means comprising second and third primary coils, wherein said second primary coil of each component gradiometer is connected in a first series superconducting compensation circuit with a series circuit of respective misalignment sensing coils of the accelerometers of one of the remaining component gradiometers and the third primary coil of the compensation means of each component gradiometer is connected in a second series superconducting compensation circuit with a series circuit of respective misalignment sensing coils of the accelerometers of the other of the remaining component gradiometers, said first and second compensation circuits of each component gradiometer having stored therein respective persistent currents of a sufficient magnitude to compensate for residual sensitive axis angular misalignment between the sensitive axes of the accelerometers of each respective component gradiometer.

23. The three-axis gradiometer according to claim 20, further comprising:
differential mode force rebalance means for applying equal and opposite forces to each proof mass upon subjection of each proof mass to a differential gravity or acceleration signal, comprising
each component gradiometer including,
first and second rebalance coils mounted adjacent respective of said proof masses, said rebalance coils of the respective component gradiometer connected in parallel with each other, and
a transformer having a secondary coil connected in parallel with the rebalance coils and at least a first primary coil coupled to the output of said second SQUID amplifier.

24. The three-axis gradiometer according to claim 23, wherein each accelerometer has a sensitive axis, further comprising:
residual axis angular misalignment compensation mean for compensating for angular misalignment of the sensitive axes of the accelerometers of each component gradiometer, including,
each accelerometer having a pair of misalignment sensing coils arranged adjacent each proof mass,
each said transformer of said differential mode force rebalance means comprising second and third primary coils, wherein said second primary coil of the compensation means of each component gradiometer is connected in a first series superconducting compensation circuit with a series circuit of respective compensation coils of the accelerometers of one of the remaining component gradiometers and the third primary coil of the compensation means of each component gradiometers and the third primary coil of the compensation means of each component gradiometer is connected in a second series superconducting compensation circuit with a series circuit of respective compensation coils of the accelerometers of the other of the remaining component gradiometers, said first and second compensation circuits of each component gradiometer having stored therein respective persistent currents of a sufficient magnitude to compensate for residual sensitive axis angular misalignment between the sensitive axes of the accelerometers of each respective component gradiometer.

25. The three-axis gradiometer according to claim 24, comprising:
each accelerometer of each component gradiometer further comprising a differential levitation coil arranged adjacent the proof mass of the respective accelerometer;
each component gradiometer including a differential levitation superconducting circuit in which the differential levitation coils of the respective accelerometers are connected in parallel with each other and with a differential current conducting coil, wherein respective persistent currents are stored in said differential levitation coils so that said differential levitation coils produce respective levitation forces on the respective proof masses and levitate the respective proof masses in combination with forces exerted by said levitation coils.

26. The three-axis gradiometer according to claim 19, comprising:
means for compensating for residual sensitive axis linear misalignment between the sensitive axes of accelerometers of each component gradiometer.

27. The three-axis gradiometer according to claim 26, wherein said residual sensitive axis linear misalignment compensating means comprises:
mounting supports on which respective of the accelerometers of each component gradiometer are mounted, each mounting support comprising a pair of parallel flanges separated by transverse walls, each wall including a column portion and a flexure portion thinner than said column portion, said flexure portions being non-equidistant from the respective flanges;

each mounting support provided with means for applying force to the walls of the respective mounting support to produce a relative transverse movement between said flanges due to bending of said walls at the flexure portions; and the supports of the accelerometers of each component gradiometer being arranged with the walls of one support perpendicular to the walls of the other support to obtain two dimensional linear misalignment compensation for each component gradiometer.

28. The three-axis gradiometer according to claim 25, comprising:

means for compensating for residual sensitive axis linear misalignment between the sensitive axes of accelerometers of each component gradiometer.

29. The three-axis gradiometer according to claim 28 wherein said residual sensitive axis linear misalignment compensating means comprises:

mounting supports on which respective of the accelerometers of each component gradiometer are mounted, each mounting support comprising a pair of parallel flanges separated by transverse walls, each wall including a column portion and a flexure portion thinner than said column portion, said flexure portions being non-equidistant from the respective flanges;

each mounting support provided with means for applying force to the walls of the respective mounting support to produce a relative transverse movement between said flanges due to bending of said walls at the flexure portions; and the supports of the accelerometers of each component gradiometer being arranged with the walls of one support perpendicular to the walls of the other support to obtain two dimensional linear misalignment compensation for each component gradiometer.

* * * * *

UNITED STATES PATENT AND TRADEMARK OFFICE
CERTIFICATE OF CORRECTION

PATENT NO. : 4,841,772
DATED : June 27, 1989
INVENTOR(S) : HO J. PAIK

It is certified that error appears in the above-identified patent and that said Letters Patent is hereby corrected as shown below:

In the specification:

Column 7, line 37, change "$90_1$" to --$90_2$-- line 38, change "$90_2$" to --$90_1$-- line 44, change "90" to --$90_1$--

Signed and Sealed this

Twenty-fourth Day of April, 1990

Attest:

HARRY F. MANBECK, JR.

*Attesting Officer*    Commissioner of Patents and Trademarks